United States Patent [19]

Klumb et al.

[11] E Re. 31,583

[45] Reissued May 8, 1984

[54] FUEL ASSEMBLY HOLD-DOWN DEVICE

[75] Inventors: Ralph H. Klumb, Simsbury; John J. Hutchinson, Windsor, both of Conn.

[73] Assignee: Combustion Engineering, Inc., Windsor, Conn.

[21] Appl. No.: 220,591

[22] Filed: Dec. 29, 1980

Related U.S. Patent Documents

Reissue of:

[64] Patent No.: 3,770,583
Issued: Nov. 6, 1973
Appl. No.: 145,374
Filed: May 20, 1971

[51] Int. Cl.[3] ..... G21C 19/02

[52] U.S. Cl. ..... 376/364; 376/449

[58] Field of Search ..... 376/364, 449, 445, 444, 376/438, 440

[56] References Cited

U.S. PATENT DOCUMENTS

| | | | |
|---|---|---|---|
| 3,015,616 | 1/1962 | Stortz et al. | 376/440 |
| 3,103,477 | 9/1963 | Mong | 376/364 |
| 3,158,543 | 11/1964 | Sherman et al. | 376/449 |
| 3,231,476 | 1/1966 | Thome | 376/438 |
| 3,255,091 | 6/1966 | Frisch | 376/446 |
| 3,398,050 | 8/1968 | Yevick et al. | 376/364 |
| 3,475,273 | 10/1969 | Krawiec | 376/445 |
| 3,481,832 | 12/1969 | Rickert | 376/444 |
| 3,801,734 | 4/1974 | West | 376/364 |
| 3,814,667 | 6/1974 | Klumb et al. | 376/364 |

FOREIGN PATENT DOCUMENTS 1159971 7/1969 United Kingdom ..... 376/364

OTHER PUBLICATIONS

RESAR-3S, pp. 4.2-9-4.2-13 (7/75) Maine Yankee, Exhibit 1.

Design and Performance of C.E. All-Zircaloy Fuel Assemblies, Anderson et al, TIS-6138, pp. 1-9, 5/79.

*Primary Examiner*—Sal Cangialosi

*Attorney, Agent, or Firm*—L. James Ristas

[57] ABSTRACT

The invention provides a hold-down device which maintains a net downward force on a fuel assembly in a nuclear reactor under all thermal and hydraulic conditions in the reactor core region. The hold-down device is particularly applicable in reactors having stainless steel support barrels and Zircaloy guide tubes.

The hold-down device of the preferred embodiment of the invention is comprised of coil springs coaxially disposed about alignment posts which extend upwardly from the top end plate of each fuel assembly. A hold-down plate is slideably mounted on the alignment posts and the coil springs are interposed, in compression, between the hold-down plate and the top end plate. In use, the coil springs bias the hold-down plate upwardly against a core alignment plate to provide a downward force on the fuel assembly. The hold-down plate may also serve as a lifting surface for the fuel assembly during fuel handling.

4 Claims, 7 Drawing Figures

26
28
54
72
66
54
54
30
66
68
d
56
56
38
58
58
52
62
36
36
44
44
42
32
42
44
44
46
40
48
22
50
50
50

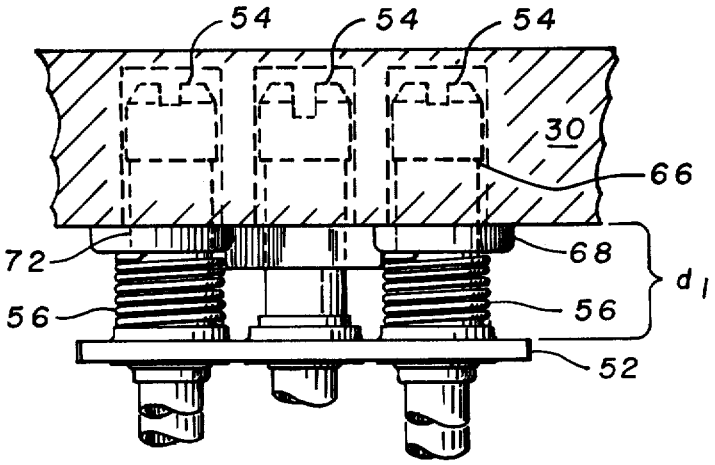
FIG. 5a
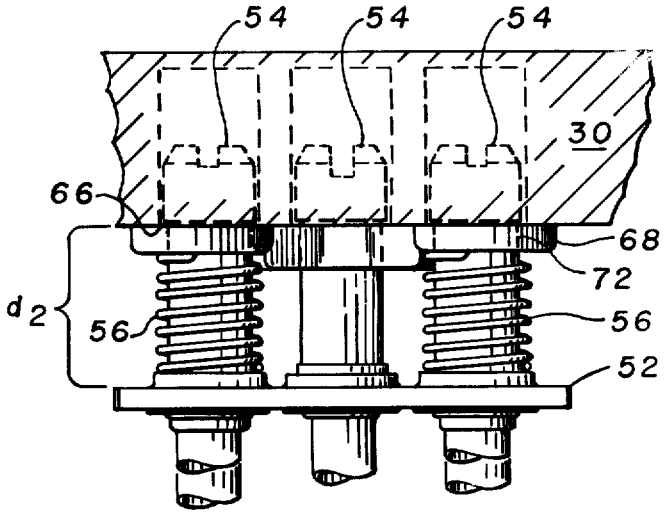
FIG. 5b
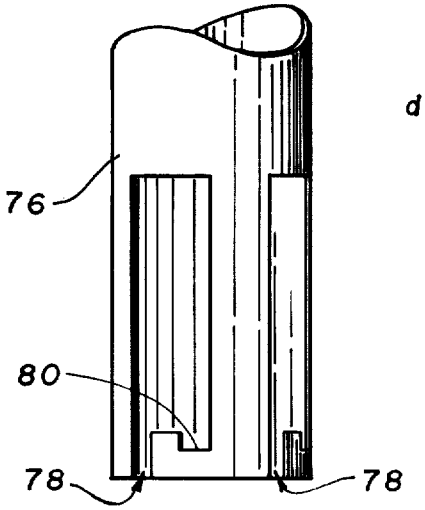
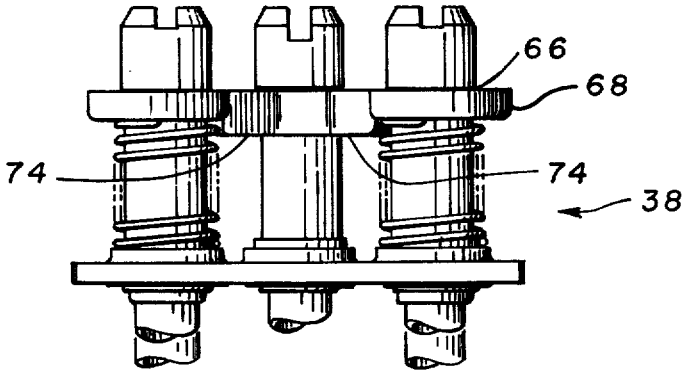
FIG. 6

FUEL ASSEMBLY HOLD-DOWN DEVICE

Matter enclosed in heavy brackets [ ] appears in the original patent but forms no part of this reissue specification; matter printed in italics indicates the additions made by reissue.

BACKGROUND OF THE INVENTION

The present invention relates to nuclear fuel assemblies and more particularly to hold-down devices for nuclear fuel assemblies. More particularly still the invention, in its preferred embodiment, provides an improved fuel assembly hold-down device having additional utility as the lifting surface during handling of the fuel assembly.

In most nuclear reactors the core portion is comprised of a large number of elongated fuel elements grouped in and supported by frameworks referred to as fuel assemblies. The fuel assemblies are generally elongated and receive support and alignment from upper and lower alignment and support grids. These grids, often referred to as support or alignment plates, are themselves directly or indirectly attached to a support barrel which surrounds the entire core and extends beyond the ends thereof. In the most common configuration the axis of the core support barrel extends vertically and the various fuel assemblies are also arranged vertically and receive support by resting at their lower ends upon the lower support plate.

Local temperatures at various locations within the core may vary greatly and accordingly the expansion experienced by the various materials and elements in the core region may vary from location to location. Further because the materials used in the core region are not all the same, they exhibit different thermal growth characteristics. The thermal expansion of the various members in the core region in the axial or vertical direction may be quite significant, particularly at the temperatures found within a nuclear reactor and because the length of some of the members involved may be 12–15feet or more. For these reasons, the fuel assemblies are not usually attached to the upper and lower alignment plates but rather are supported in a manner which permits some relative motion therebetween. This axial thermal expansion differential between the fuel assemblies and the core support barrel is generally accommodated by insuring that the axial spacing between the upper and lower core support and alignment plates is somewhat greater than the axial length of the fuel assemblies for the entire range of thermal conditions in the core region.

In order to facilitate handling and installation of the fuel assemblies, they are generally not secured to the lower core support plate and rely upon axially movable alignment posts extending downwardly through guide holes in the support plate for lateral alignment. In most reactors a fluid coolant, such as water, is directed upwardly through apertures in the lower core support plate and along the fuel rods in the various fuel assemblies to receive the thermal energy therefrom. The physical configuration of the various fuel assemblies is such that the coolant may experience a significant pressure drop in passing upwardly through the core region. This pressure drop necessarily produces a lifting force on the fuel assemblies. In some instances, the weight of the fuel assembly is sufficient to overcome the upward hydraulic lifting forces under all operating conditions.

However, this is often not the case, particularly when the coolant density is high as at reactor startup and additionally because of increasing coolant flow rates. When the hydraulic forces in the upward direction on a particular fuel assembly are greater than the weight of that fuel assembly, the net resultant forces on the fuel assembly will be in the upward direction and will cause the assembly to move upward into contact with the upper core alignment plate. This motion of a fuel assembly, if uncontrolled, may result in damage to the fuel assembly and its fuel rods or to the upper alignment plate and must, therefore, be avoided. In order to prevent hydraulic lifting of the fuel assemblies various hold-down devices have been employed.

For the most part the vertically extending structural members of a fuel assembly and the core support barrel have been of the same material, stainless steel. Because they have been of the same material, the axial thermal expansion differential between them has been greatly limited and only small variations in the spacing between the upper end of the fuel assembly and the upper core alignment plate have existed. Leaf springs acting between the upper core alignment plate and the upper end of a fuel assembly have generally been sufficient to overcome any lifting of the fuel assemblies.

More recently, however, the vertically extending structural members of a fuel assembly have been fabricated of Zircaloy. This is particularly the case when the vertically extending structural members of a fuel assembly are the guide tubes into which control rod fingers are inserted. Because the materials used in the vertically extending support structure of the fuel assemblies are different than that used in the core support barrel, the opportunity for a significant thermal expansion differential is created. Increasing temperatures in the core region and increasing length of fuel assemblies serve to further aggrevate the thermal expansion differential problem. As an example, in present reactors having a stainless steel core support barrel and fuel assemblies supported by Zircaloy guide tubes, the gap between the fuel assembly and the upper core alignment plate may vary ⅜ of an inch or more due to the linear expansion differential. The hold-down means employed must be capable of providing an adequate hold-down force to the fuel assembly over the entire possible gap range. The leaf spring, however, is inherently a low deflection device and for the spring size limitations dictated by the reactor core environment, is generally incapable of providing the necessary hold-down forces over the entire range of gap distances which might be encountered.

SUMMARY OF THE INVENTION

There is provided in the present invention a hold-down device which is capable of providing adequate hold-down forces to a nuclear fuel assembly over the full range of thermal expansion differential distances which might be encountered in a reactor. The hold-down device is readily adaptable to existing pressurized water reactor fuel assembly configuration, as well as others. The fuel assembly hold-down device may be preloaded to accommodate the differential thermal expansion between the fuel assembly and the core barrel as well as mechanical tolerance accumulations without reducing the hold-down force below a preset value. The hold-down device, in its preferred embodiment, additionally serves as the lifting surface for each fuel assembly during refueling and handling of the assembly.

According to the present invention, a fuel assembly hold-down device is comprised of a hold-down plate and coil spring means in compression serially interposed between the upper core alignment plate and the upper end fitting of the fuel assembly. The coil spring in compression acts to bias the fuel assembly downwardly against hydraulic forces in the upward direction and is resiliently deflectable or compressable over the entire range of thermal expansion differential distances which might be encountered in a reactor. More particularly, the hold-down device of the invention provides one or more alignment posts which may be extensions of the control element guide tubes extending upwardly from the upper end fitting of a fuel assembly and about which the coil springs are coaxially disposed. Such an arrangement laterally restrains the coil springs during operation of the hold-down device and serves to capture the spring in the unlikely event of fracture. The hold-down plate is formed with apertures therein. The aperatures are of a size and location which permit slideable movement therethrough of at least a portion of each of the alignment posts. In the preferred embodiment of the invention, the alignment posts have radially enlarged shoulders at their upper ends which limit the upward travel of the hold-down plate relative to the fuel assembly. The hold-down plate serves as a force bearing and pressure transmitting member which is interposed between the upper core alignment plate and the coil spring. Apertures existing in the upper core alignment plate are vertically in registry with the alignment posts on the fuel assembly and are sized to permit slideable insertion thereinto of the enlarged shoulder portions of the alignment posts. The alignment posts may move upwardly and downwardly within the apertures in the upper core alignment plate to accommodate the spacing change between the upper core alignment plate and the fuel assembly which occurs due to the thermal expansion differential.

In the preferred embodiment of the invention, the hold-down plate is formed with horizontally extending leg portions which preferably are positioned symmetrically about the axial center of gravity of the fuel assembly such that they serve as a lifting surface for a fuel assembly grabbing tool when the fuel assembly is being handled. This additional capability of the hold-down device of the invention is afforded because upward movement of the hold-down plate is restricted by the shoulders on the alignment posts and the alignment posts in turn are rigidly secured to the structural framework of the fuel assembly.

BRIEF DESCRIPTION OF THE DRAWINGS

FIGS. 5a and 5b are partial side views of a fuel assembly at a core location not having a control element assembly and showing the hold-down device under conditions of minimum and maximum spacing respectively between the fuel assembly and the upper alignment plate.

FIG. 6 is a side view of the upper portion of a fuel assembly incorporating the hold-down device of the invention and showing the coupling member of a fuel handling machine poised thereabove.

DESCRIPTION OF THE PREFERRED EMBODIMENT

Figure 1:
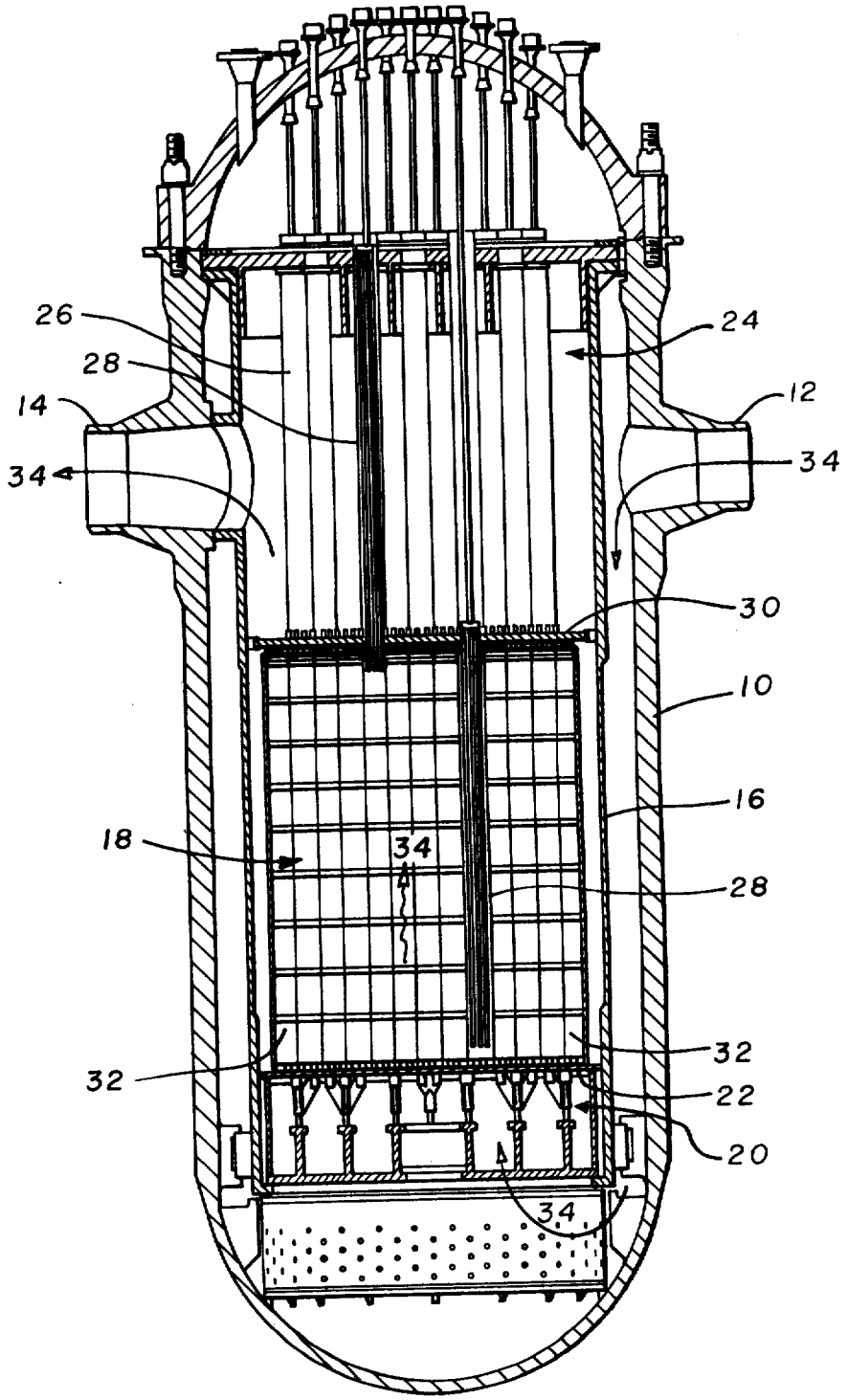
FIG. 1 is a vertical section view of a nuclear reactor in accordance with the concepts of the invention.

Referring first to FIG. 1 there is illustrated the reactor pressure vessel 10 for a pressurized water reactor. Pressure vessel 10 extends generally in a vertical direction and has coolant inlet means such as nozzle 12 and coolant exit means such as nozzle 14 which provide entry and egress for coolant, in this instance water, passing through the reactor. A stainless steel core support barrel 16 is rigidly attached to and supported by pressure vessel 10. Core support barrel 16 contains the reactor core 18 supported upon core support assembly 20. Core support assembly 20 is rigidly affixed to core support barrel 16 at or near the lower end thereof and includes at its upper extent core support plate 22. An upper guide structure 24 is also contained in the core support barrel 16 and is rigidly affixed to the barrel above core 18, usually at the upper end of core support barrel 16. Upper guide structure 24 principally houses shrouds 26 for control element assemblies 28 and includes at its lower extent the upper core alignment plate 30. The shrouds 26 are joined to alignment plate 30 to form an integral structure with guide structure 24. Reactor core 18 is comprised of a plurality of vertically extending nuclear fuel assemblies 32 arranged in a substantially circular geometry. A typical reactor contains more than 200 of such fuel assemblies 32. The coolant flow path within pressure vessel 10 as indicated by arrows 34 is from inlet nozzle 12 downwardly between pressure vessel 10 and core support barrel 16 into the area of core support assembly 20 and upwardly through various coolant openings in core support plate 22 through the fuel assemblies 32 in core 18, and ultimately out through outlet nozzle 14.

Figure 2:
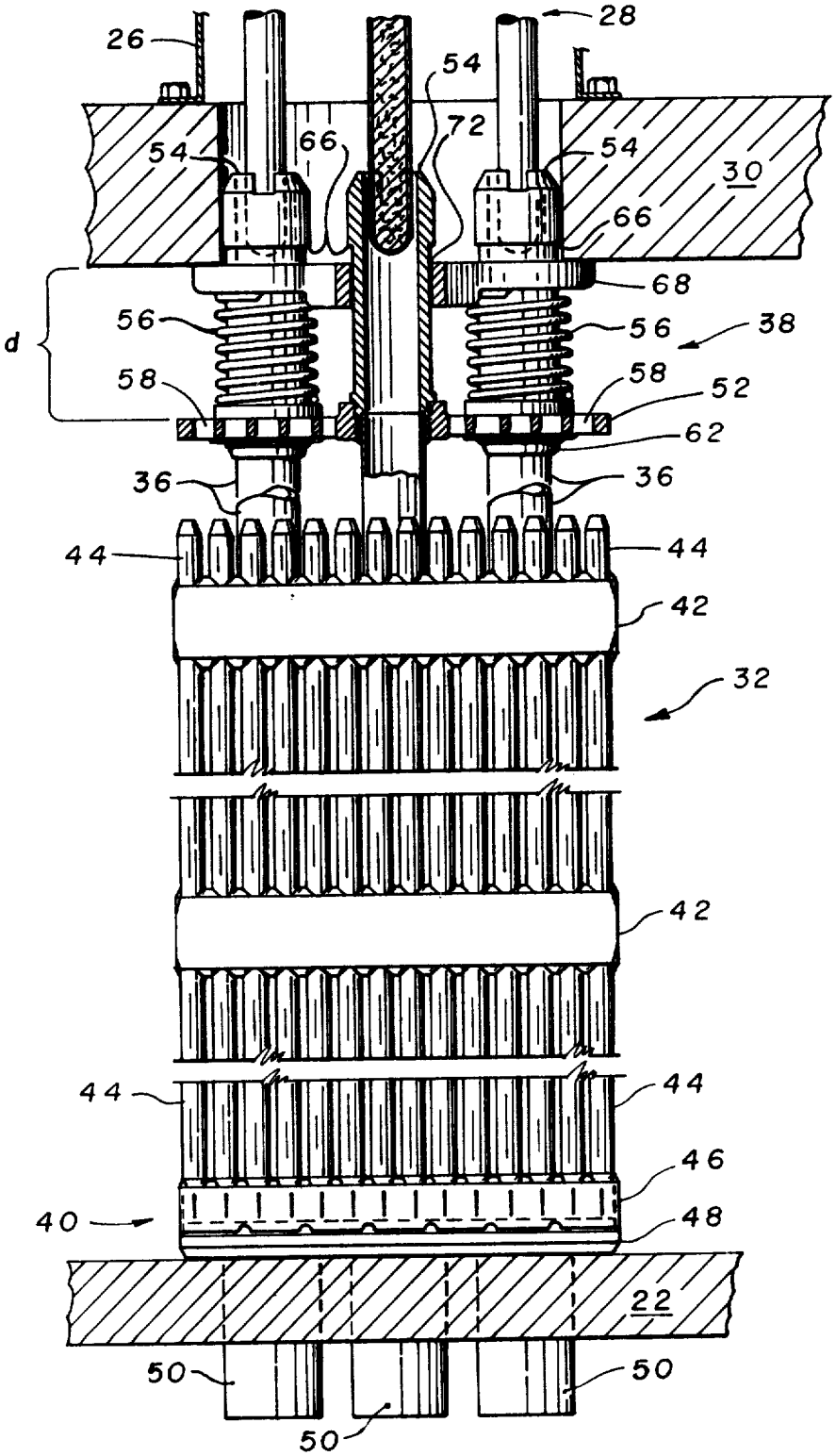
FIG. 2 is a fragmentary side view of a fuel assembly extending between upper and lower core alignment plates at a control element assembly location and having a section showing the hold-down device of the invention.

A typical fuel assembly 32, seen more clearly in FIG. 2, is comprised of five vertically extending parallel Zircaloy guide tubes 36 coextensive with one another and rigidly attached to upper and lower end fittings 38 and 40, respectively. Guide tubes 36 provide the vertical structural framework for fuel assembly 32. A plurality of rectangular Zircaloy spacer grids 42 are positioned at various elevations along guide tubes 36 and are welded thereto. Fuel rods 44 extend in parallel vertical arrangement within fuel assembly 32 and their pitch over the full length of the fuel assembly is maintained by spacer grids 42. A large number of fuel rods 44, for instance 176, are individually retained by compartments in the several spacer grids 42. A retention grid 46 welded to the upper portion of the lower and fitting 40 consists of spring strips interlocked in egg crate fashion and welded to perimeter strips. Overlapping spring fingers, formed within the spring strip, engage a machined groove in the lower end of each fuel rod 44. In this manner all rods 44 are both axially and laterally restrained.

Lower end fitting 40 is comprised essentially of a lower end plate 48 having alignment posts 50 mechanically secured thereto and depending downwardly therefrom. Alignment posts 50 fit slideably into holes in the core support plate 22 and provide the necessary vertical support and lateral alignment of the lower end of the fuel assembly 32. In some core designs, the core support plate has the alignment posts affixed thereto and the posts are slideably engaged by holes in the fuel assembly lower end fitting. The length of alignment posts 50 is sufficient to ensure, that even in the event of maximum possible upward lifting of fuel assembly 32 during an accident, some part of alignment post 50 will be retained by core support plate 22 and prevent lateral movement of the fuel assembly. In order to facilitate installation and removal of each fuel assembly, the alignment posts 50 are not captured in a way which restricts their vertical movement.

The upper end of each fuel assembly 32 includes an upper end fitting 38 which is mechanically secured to guide tubes 36 in a manner to be discussed more thoroughly below. Included within upper end fitting 38 are an upper end plate 52 extending transversely of the vertically extending guide tubes 36 and alignment means, such as upwardly extending alignment posts 54. As earlier mentioned an upper core alignment plate 30 affixed to core support barrel 16 extends horizontally of the core support barrel and is located slightly above the end plates 52 of the fuel assemblies 32 making up core 18. Holes in alignment plate 30 are positioned and sized to provide close slideable engagement of the alignment posts 54. In this manner alignment plate 30 provides the alignment of the upper ends of the fuel assemblies 32.

In the preferred embodiment of the invention, alignment posts 54 are axially co-incident with guide tubes 36 and have passageways extending axially therethrough which are co-incident with the interior passages of the guide tubes. The control element assemblies 28 of the present embodiment each comprise five parallel elongated downwardly extending control fingers which are insertable into and withdrawable from the fuel assemblies 32 by way of guide tubes 36. As seen in FIG. 2, the alignment plate 30 has a single large hole extending therethrough at each control element assembly location. The hole is sized and shaped to allow total insertion of a control element assembly 28 into a fuel assembly 32 while laterally restraining the outer most of alignment posts 54. Because not all fuel assemblies 32 have control element assemblies 28, the alignment holes in plate 30 at those locations need not extend entirely through alignment plate 30 and each alignment post 54 may be received in an individual hole, as seen in FIGS. 5a and 5b.

The distance between lower core support plate 22 and upper core alignment plate 30 is such that a gap or spacing "d" will exist between upper core alignment plate 30 and upper end plate 52. Gap "d" exists to accommodate mechanical tolerances and the thermal expansion differential exhibited between fuel assembly 32 and core support barrel 16 in the vertical direction. In the present instance wherein guide tubes 36 are more than 13 feet in length and are of Zircaloy with core support barrel 16 being of stainless steel, the gap d between end plate 52 and alignment plate 30 can vary $\frac{5}{8}$ of an inch or more between the cold ane hot extremes of reactor operation. The slideable engagement of alignment posts 50 by the holes in core support plate 22 permit some upward movement of an entire individual fuel assembly 32 in the event that the hydraulic lifting forces of the coolant moving upwardly through core 18 are greater on the fuel assembly 32 than the weight of the fuel assembly.

Even though a fuel assembly 32 might weigh as much as 1400 lbs., the upward hydraulic forces directed thereagainst in present reactors, particularly when the coolant is cold and has greatest density, is often sufficient to lift the fuel assembly upward from core support plate 22 and into contact with upper alignment plate 30. In order to prevent such lifting, the fuel assembly hold-down device of the invention is employed. According to the invention, the fuel assembly hold-down device includes coil spring means, such as coil springs 56, in compression and acting between alignment plate 30 and fuel assembly upper end plate 52 to provide a downward force against fuel assembly 32. The coil spring means, unlike an inherently low deflection device such as a leaf spring, is capable of a much greater range of deflection than a leaf spring of comparable size. Because size, economy and simplicity are important in providing an effective hold down for the fuel assemblies the coil spring means are preferred in providing the hold-down function.

Figure 3:
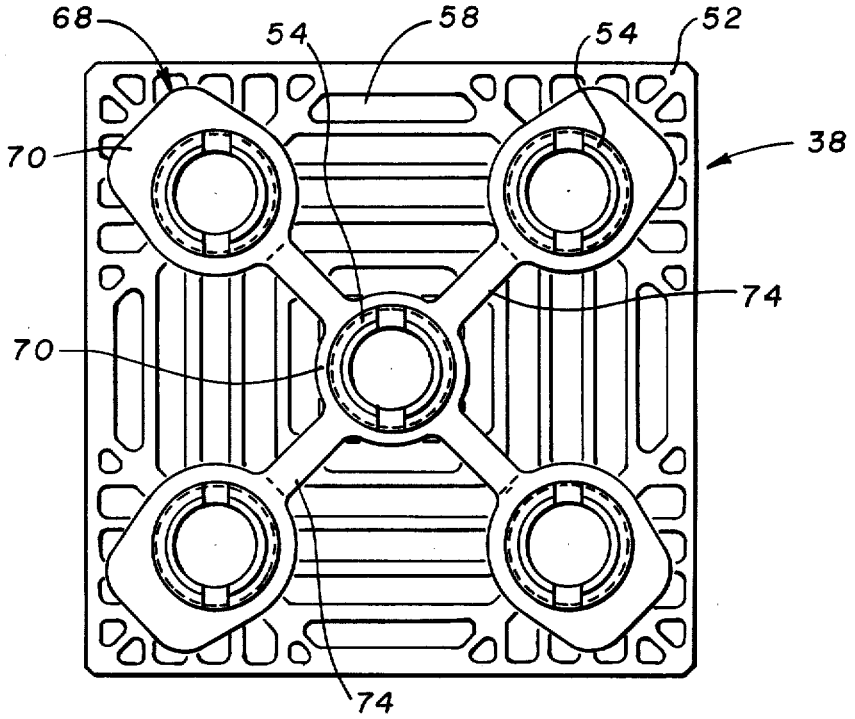
FIG. 3 is a top end view of a fuel assembly end fitting incorporating the hold-down device of the invention.

According to the preferred embodiment and as seen in FIG. 3, five alignment posts 54 axially co-incident with the five guide tubes 36 are arranged such that one alignment post and guide tube extend axially through the center of fuel assembly 32 and the other four are spaced radially outward therefrom and extend parallel thereto. Alignment posts 54, upper end plate 52 and guide tubes 36 are mechanically joined to form an integral structure. Upper end plate 52, seen most clearly in FIG. 3, is a cast metal structure having coolant openings 58 therein through which coolant exhausts from the fuel assembly. Additionally, five holes extend through the plate at the locations where the guide tubes 36 and the alignment posts 54 are joined to plate 52.

Figure 4:
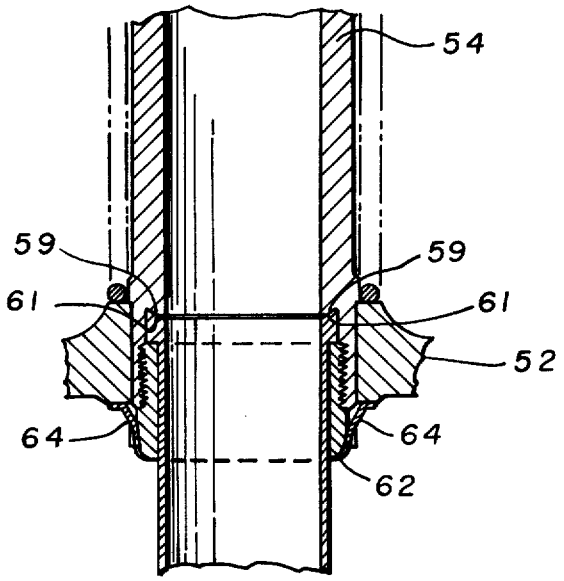
FIG. 4 is an enlarged sectional view illustrating the juncture of a guide tube with the fuel assembly upper end fitting.

As seen in FIG. 4, the lower ends of stainless steel guide posts 54 are pressed into the proper holes in end plate 52. The inner wall of alignment post 54 is recessed and threaded near its lower end and forms shoulder 59. The upper end of guide tube 36 is enlarged radially outwardly forming shoulder 61 for axial mating engagement with shoulder 59 in alignment post 54. A nut 62 disposed about guide tube 36 is inserted upwardly between guide tube 36 and alignment post 54 and is threaded into engagement with the threads in post 54 to maintain the axial engagement therebetween. Locking means 64 are affixed, as by welding to end plate 52 and engage nut 62 in a manner preventing unthreading rotation of the nut. This arrangement provides a unitary structure between alignment posts 54, end plate 52 and guide tubes 36. The central alignment post 54, because of the difficulty of access thereto may be threaded into plate 52 and guide tube 36 slideably engaged therewithin.

Each of the alignment posts 54 is generally cylindrical in shape and extends several inches above upper end plate 52. The upper end portion of each alignment post 54, generally about 1 inch, is radially enlarged to form shoulder 66, the function of which is discussed below. The alignment hole or holes in alignment plate 30 are sized to accommodate close sliding engagement of the radially enlarged portion of each alignment post 54. The coil springs 56 used to provide the hold-down forces on the fuel assembly are coaxially disposed about one or more of the alignment posts 54. While it might be possible in some arrangements to use only one coil spring 56 about the central alignment post 54, a more desirable arrangement is obtained wherein coil springs 56 are coaxially disposed about each of the four outer alignment posts 54 and act against hold-down plate 68. This arrangement is only one of several possible but provides a symmetrical placement of the springs and allows each spring to be sized to provide only one-fourth of the overall downward force needed.

Moveable hold-down plate 68 is slideably mounted on alignment posts 54 and is capable of movement between end plate 52 and the shoulder 66 on the alignment posts. Shoulders 66 restrict the upward travel of hold-down plate 68 relative to fuel assembly 32, making the plate an integral part thereof. The hold-down plate 68 of the invention includes hub portions 70 with apertures 72 extending vertically therethrough and sized to permit slideable passage therethrough of said alignment posts 54. The several hub portions 70 have legs 74 extending radially outward from them in a horizontal direction, and in the preferred embodiment legs 74 serve to interconnect hub portions 70 making up hold-down plate 68. The radially outer most portions of a hold-down plate 68 extend sufficiently beyond the alignment hole or holes in plate 30 to engage the lower surface of plate 30. Because hold-down plate 68 additionally serves as a lifting surface in handling fuel assembly 32 as will be discussed more thoroughly below, these lifting surfaces are preferably symmetrically disposed about the vertical center line of gravity of fuel assembly 32.

The coil springs 56 which serve to provide the required hold-down forces are coaxially disposed about various ones of the alignment posts 54 between upper end plate 52 and the hold-down plate 68. Springs 56 are sized and preloaded to ensure that a net downward force of 150 lbs. will be maintained on fuel assembly 32 for all normal and anticipated transient flow and temperature conditions. The cyclic loads on the spring are minimal since the spring operates over an extended range, as seen in FIGS. 5a and 5b, only during reactor startup and shutdown conditions. In the example of the preferred embodiment, each spring 56 is fabricated of Inconel X750, has a free length of about 4.5 inch, an internal diameter of 1.5 inch, an external diameter of 1.8 inch, a wire size of 0.135 inch, and has 8½ coils yielding a spring rate of 17 lbs. per inch. As disposed about alignment posts 54, each spring 56 is held captive in the event of a spring fracture at almost any point in the spring.

As seen more clearly in FIGS. 5a and 5b, the hold-down plate 68 which is upwardly biased by coil springs 56 acts against the under side of upper core alignment plate 30 resulting in a downward force against upper end plate 52 and accordingly fuel assembly 32. During the fuel loading operation the various fuel assemblies 32 are loaded into the reactor and the upper guide structure 24 which includes upper alignment plate 30 rigidly affixed thereto, is then lowered into place and rigidly joined to core support barrel 16 at or near the top thereof. The vertical positioning of alignment plate 30 provides a gap at cold conditions between alignment plate 30 and upper end plate 52 having a distance, $d_1$, The gap distance is smallest at reactor cold conditions and $d_1$ will normally be about 2.4 inches. As seen in FIG. 5a, this gap distance is such that hold-down plate 68 is moved downwardly along alignment post 54 against the upward force of springs 56 resulting in a significant downward force against fuel assembly 32. This is the preload mentioned earlier. As the temperature in the core 18 increases during reactor operation, the differences between the linear thermal expansions of fuel assembly 32 and core support barrel 16 result in an increased gap distance, $d_2$, and accordingly the spring biased hold-down plate 68 which acts upwardly against alignment plate 30 is permitted to slide upwardly along alignment posts 54 to the extent necessary. This somewhat reduces the downward force which the springs exert against fuel assembly 32, however, as previously mentioned the initial preload on springs 56 at the time of installing guide structure 24 is such that, even when maximum gap distance $d_2$ occurs, there results a net downward force on the fuel assembly of about 150 lbs.

The axial length of alignment post 54 above upper end plate 52 is sufficient to ensure that the alignment post will always be laterally engaged by alignment plate 30. Further still, the radially enlarged shoulder 66 of each of the several alignment posts 54 is sufficiently distant from upper end plate 52 that even for a maximum gap distance, $d_2$, which occurs when the reactor is hot, the upper core alignment plate 30 will continue to exert a downward force against hold-down force against hold-down plate 68 and accordingly on fuel assembly 32.

The shoulders 66 on alignment posts 54 restrict the upward travel of hold-down plate 68, as mentioned above, with the result that hold-down plate 68 forms a lifting surface for fuel handling means during fueling operations. A typical fuel assembly coupling member 76, as seen in FIG. 6, is employed to lift and move individual fuel assemblies 32 during fueling and refueling operations. Fuel coupling member 76 is usually positioned at the lower end of a rotatable and translatable shaft. Those fuel assemblies 32 which receive control element assemblies will normally be moved with the control elements fully inserted thereinto. This will dictate the number and geometry of slots 78 in coupling member 76. Typically, the upper or head portion of a control element assembly 28 appears to coupling member 76 as a vertical extension of hold-down plate 68. Accordingly, slots 78 are spaced at 90° intervals about the cylindrical coupling member 76 and are axially long enough to receive hold-down plate 68 and a control element head portion, if present. The coupling member 76 is positioned above a fuel assembly 32 with slots 78 aligned with the legs 74 on hold-down plate 68. Coupling member 76 is then moved downwardly over legs 74 and rotated and raised slightly to supportingly engage legs 74 in seats 80. In this manner the fuel hold-down device of the invention serves also as the lifting surface for the fuel assembly during handling thereof.

It should be appreciated that, while the fuel assembly hold-down device of the preferred embodiment is affixed to each fuel assembly and may also be used as a handling surface, the scope of the invention would also include a similar hold-down device employing coil springs wherein the alignment posts extend downwardly from the upper core alignment plate and into holes in the fuel assembly upper end fitting.

While we have illustrated and described a preferred embodiment of the invention, it is to be understood that such a merely illustrative and not restrictive and that variations and modifications may be made therein without departing from the spirit and scope of the invention. We, therefore, do not wish to be limited to the precise details set forth but desire to avail ourselves of such changes as fall within the purview of the invention.

What we claim is:

1. In a nuclear fuel assembly including, *a plurality of* longitudinally extending rigid support [means] *tubes*;

upper and lower end fittings supported by said support [means] *tubes* at opposite ends thereof; a plurality of elongated fuel elements in parallel relationship and extending substantially between said upper and lower end fittings and supported by said support [means] *tubes*, hold-down apparatus for said fuel assembly in which said upper end fitting comprises:

an end plate supported by said support [means] *tubes* against downward motion relative thereto and extending transversely thereof;

[alignment means] *a plurality of hollow cylindrical posts* projecting longitudinally upward from and supported against upward motion relative to said end plate, *each of* said [alignment means] *posts* having an outwardly enlarged shoulder affixed thereto and spaced upwardly from said end plate[;], *said posts and end plate including passageways extending vertically therethrough in registry with said tubes whereby a control element may be inserted therewithin into said fuel assembly;* force transmitting means slidably mounted on said [alignment means] *posts* and movable therealong between said shoulder and said end plate, *and including a hold-down plate having at least one hub portion, an aperature in and extending through said hub portion for relative slidable passage therethrough of said posts,* and [having a portion thereof] *leg portions* extending laterally beyond said [shoulder] *shoulders* for receiving a downward force applied to said *leg* [portion] *portions*; and spring means *coaxially disposed about a plurality of said posts and being* interposed *in compression* between said force transmitting means and said end plate for biasing said force transmitting means upwardly from said plate whereby a said downward force on said force transmitting means is yieldably transmitted to said fuel assembly.

[2. The apparatus of claim 1 wherein said force transmitting means comprise a hold-down plate having at least one hub portion; an aperture in and extending through said hub portion for relative slidable passage therethrough of said alignment means; and leg means extending substantially radially outward from said hub portion beyond said enlarged shoulder on said alignment means.]

3. The apparatus of claim [2] *1* wherein said [alignment means comprise a plurality of cylindrical posts extending upwardly from said end plate and] *posts are* symmetrically disposed about the vertical axis passing through the center of gravity of said fuel assembly; and said hold-down plate includes said same plural number of apertured hub portions for relative insertion therethrough of said [alignment] posts, said hub portions being joined and positioned relative to one another [and] by said leg [means] *portions*.

[4. The apparatus of claim 1 wherein said spring means comprise a coil spring, said coil spring being in compression and coaxially disposed about said alignment means.]

5. The apparatus of claim 3 wherein said spring means comprise coil springs, said coil springs being in compression and coaxially disposed about a plurality of said [alignment] posts.

[6. The apparatus of claim 1 wherein said fuel assembly includes a hollow tube open at its upper end and extending at least the full extent of said fuel elements parallel thereto and in vertical alignment with said alignment means; and said alignment means and said end plate include a passageway extending vertically therethrough in registry with said hollow tube whereby a control element may be inserted therewithin into said fuel assembly.]

[7. The apparatus of claim 3 wherein said fuel assembly includes hollow tubes open at their upper ends and extending at least the full extent of said fuel elements thereto and in vertical alignment with alignment posts; and said alignment posts and said end plate include passageways extending vertically thereto in registry with said hollow tubes whereby a control element may be inserted therewithin into said fuel assembly.]

[8. The apparatus of claim 7 wherein said hollow tubes comprise said support means extending between said fuel assembly end fittings.]

*9. The apparatus of claim 5 wherein the posts are rigidly secured to the end plate.*

* * * * *